United States Patent

[11] 3,540,486

[72] Inventor James M. Flounders
 Hingham, Massachusetts
[21] Appl. No. 757,998
[22] Filed Sept. 6, 1968
[45] Patented Nov. 17, 1970
[73] Assignee American Biltrite Rubber Co., Inc.
 Chelsea, Massachusetts
 a corporation of Delaware

[54] HIGH PRESSURE HOSE
 10 Claims, 3 Drawing Figs.
[52] U.S. Cl. .................................................. 138/109,
 138/125, 138/127, 138/138
[51] Int. Cl. .................................................. F16l 11/08,
 F16l 13/14
[50] Field of Search .................................... 138/124,
 125, 126, 127, 109, 137, 138

[56] References Cited
 UNITED STATES PATENTS
 2,525,272 10/1950 Rhoton ........................ 138/126X
 2,564,602 8/1951 Hurst ........................... 138/125

FOREIGN PATENTS
 685,464 4/1964 Canada ......................... 138/125
 918,349 2/1963 Great Britain ................. 138/125
 939,423 10/1963 Great Britain ................. 138/109

Primary Examiner—Laverne D. Geiger
Assistant Examiner—R. J. Sher
Attorney—Kenway, Jenney and Hildreth ABSTRACT: The invention is a composite hose combined with a coupling, the characteristics of the hose and the coupling being such as together to minimize leaking between the hose and coupling, rupture of the hose and resulting break away from the coupling, and leakage from the hose itself. The hose is plural-layered, for example, as follows: An innermost layer of a plastic material such as nylon, next a layer of rubber, then a layer of a wire mesh reinforcement, and possibly a final outer layer of nylon or rubber. The coupling is compound, and comprises an inner shank fitting inside the end of the hose and an outer sleeve axial with the inner shank and overlying the end of the hose, the outer sleeve being compressed so as to squeeze the wall of the hose end and thus solidly anchor the end of the hose within the coupling.

Patented Nov. 17, 1970

3,540,486

INVENTOR.
JAMES M. FLOUNDERS
BY
Kenway, Jenney + Hildreth
ATTORNEYS

HIGH PRESSURE HOSE

BACKGROUND OF INVENTION

Hoses, particularly those designed for high pressure wear, are of several kinds, but the majority of these are designed to adapt to various kinds of couplings. The hose manufacturer may fit the couplings to the hose upon the request of the customer, or the hose manufacturer may sell hose to the customer who in turn puts on his own couplings. The fitting of the coupling to the hose is generally done by a squeezing operation, and this squeezing operation can be done by either a crimping operation on the outside of the coupling, or a wedging operation such as is used in a compression fitting.

It has been found out that a large majority of the defects found in hydraulic hosing are leakage between the coupling and the hose itself. It is seldom that the hose itself outside the coupling breaks down. (When it does, it sometimes is because the material making up the hose itself is not impervious to the hydraulic fluids being carried by the hose, or the pressure of the fluid in the hose may cause rupture.)

In order to satisfy themselves that the particular hose they are using is the proper one for their particular coupling, the various manufacturers who assemble the hose and coupling as a combination, have developed a broad array of simulated life test. There is no single standard life test used by all manufacturers. The hose manufacturer must thus supply hose to the coupling manufacturer (who will complete the combination) which will meet the coupling manufacturer's particular test. This imposes serious problems on the hose manufacture.

In addition to the above, there is a lot of so-called "overhosing" that is being done because of a desire to avoid leaks. That is, if a job requires, for example, a fluid working pressure of 1,000 pounds per square inch, the coupling manufacturer or his customer will specify hosing that shall withstand tests of 5,000 pounds per square inch. That is, the hose itself is actually underworked in use with resulting expense to the ultimate customer due to the higher cost of the stronger hose.

One reason for the breakdown of the hose at the coupling presumably is a very high shear stress occuring on the inner hose liner, this being caused in part by unequal stress distribution within the hose confined within the coupling-hose joint. These high shear stresses are also caused in part by the coupling when it is crimped or swedged onto the hose, or when the compression fitting (if that is being used) is screwed up tightly. Under such compression, the strain of the elastomers of the hose (caused by the squeezing) results in very high shear stresses unless such strains are made as uniform as possible. It is found that in conventional hoses, fairly low shear stresses are occuring and even these low shear stresses cause breakdown of the elastomers. It is desired, therefore, to obtain a hose-coupling combination which will give an optimum performance under all conditions for which the particular combination is manufactured and put into use. Such is the general purpose of this invention.

SUMMARY

One object of the invention is therefore to provide a hose and a hose-coupling combination which will have a much longer service life than hitherto manufactured hoses and hose-coupling combinations.

Another object of the invention is the provision of a hose of the stated class in which the unit stresses occuring in the hose materials themselves within the enclosure of the coupling are reduced, by being more uniformly spread throughout the hose material and its wire mesh reinforcement, thus minimizing rupture and breakdown of the hose. If rupture is to occur, it will thus do so at much higher working pressures than prior art hose-coupling combinations.

Still another object of the invention is to provide a hose in which, when the hose is subjected to impulse pressures (which is a normal occurence in hydraulic service), the resulting stresses within the coupling are distributed more uniformly to the wire reinforcement, and the hose portion confined therein, resulting in longer life for the hose.

Another object of the invention is the provision of a hose of such design that when used with a coupling, the elastomeric layers making up the hose may be specifically designed to function as an energy absorbing medium. This in turn will reduce the stresses on the wire reinforcement and permit higher working pressures.

Still another object of the invention is to provide a hose-coupling combination in which the hose structure and the coupling combined with it function to absorb the compressive stresses within the coupling shell at the time of attachment thereof, and result in a coupling system wherein the compression-induced stresses do not result in breakdown of the inner liner of the hose with resulting leakage and eventual rupture.

Other objects, features and advantages will be in part apparent and in part pointed out hereinafter.

The invention accordingly comprises the elements and combinations of elements, features of construction, and arrangements of parts which will be exemplified hereinafter described, and the scope of the application of which will be indicated in the appended claims.

Referring now to the drawings, in which is shown one of several possible embodiments of the invention:

Throughout the drawings, similar reference characters indicate corresponding parts. Also, dimensions of certain of the parts as shown in the drawings may have been modified and/or exaggerated for the purposes of clarity of illustration and understanding of the invention.

Figure 1:
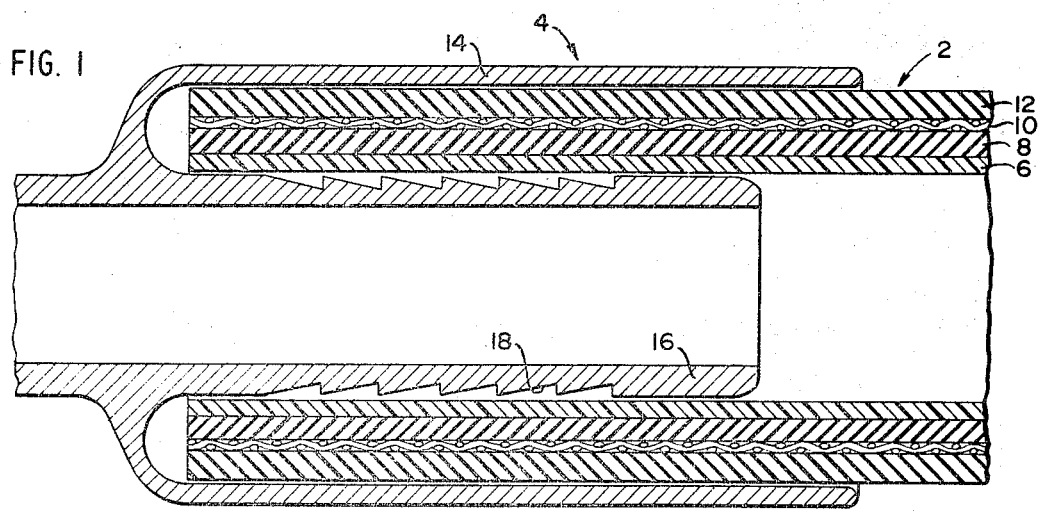
FIG. 1 is a sectional view of a hose-coupling of the instant invention, shown assembled just prior to crimping.

Referring now to FIG. 1, there is shown a hose 2 of this invention combined with a coupling 4. Hose 2 comprises several tubular layers, as shown, the layers being as follows:

The innermost layer 6 is of a tough thermoplastic material (as contrasted to a thermosetting material), such as nylon, although other thermoplastic materials such as other members of the polyamides family, as well as the polyolefins, polyesters, and thermoplastic polyurethanes may be used. The next layer 8 is a thermosetting elastomer such as natural rubber, or anyone of the synthetic rubbers or elastomers which are commonly used in making high pressure hose. Its requirements are that it be capable of being bonded to the plastic liner 6 and that it be soft enough to permit embedment therein, at least partially, of an outer layer of reinforcement 10, such as a wire mesh or a textile, both of which are conventional in the art. Overlying the elastomer layer 8 is said reinforcing layer 10, which may be a wire wrapping of woven, braided construction or the spirally wrapped type, or which may be a woven textile. Finally, preferably overlaying all of the layers is an outer protective layer 12 which may be of, for example, an elastomer or a polyamide such as the inner layer 6.

Coupling 4 comprises an outer sleeve 14 and an inner shank 16. It will be noticed that shank 16 in this embodiment is serrated as indicated by numeral 18. The diameters of the shank 16 and sleeve 14 are so adjusted in manufacture that the space therebetween will accept the hose 2 with a smooth fit.

Figure 2:
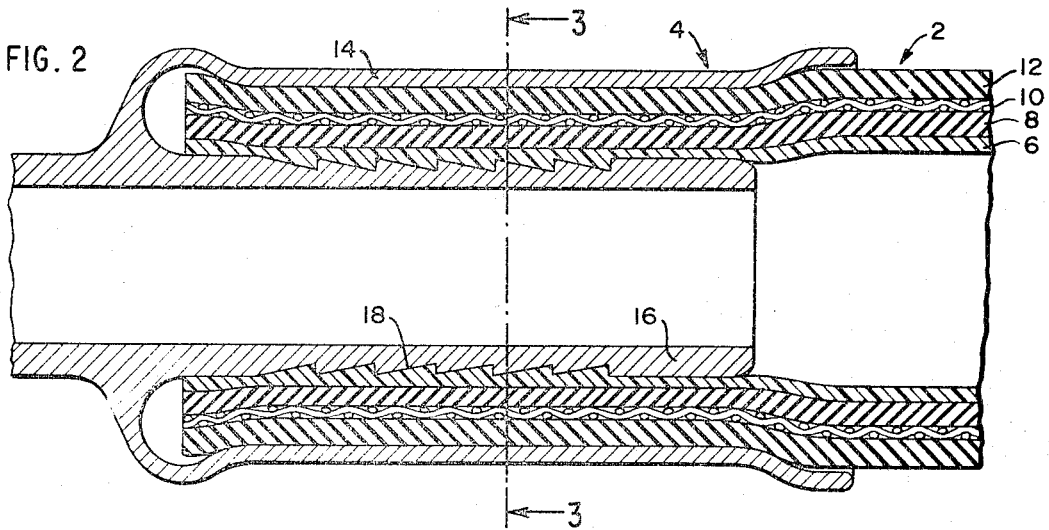
FIG. 2 is a view similar to FIG. 1, but showing the outer sleeve crimped onto the hose.
Figure 3:
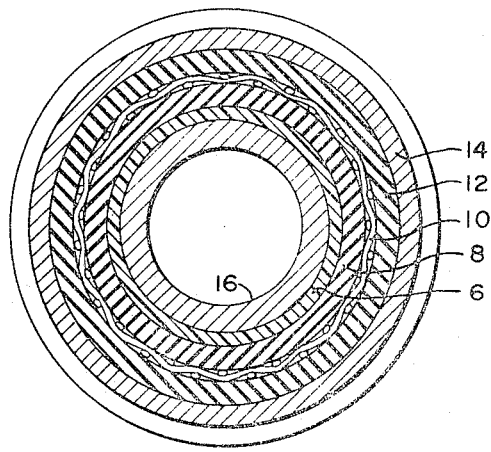
FIG. 3 is a cross-sectional view of the embodiment taken in the direction of sight lines 3–3 on FIG. 2.

FIG. 2 shows the above assembly with the sleeve 14 having been swedged or crimped down onto the hose and the shank 16. It will be observed that the nylon inner layer 6 has yielded during crimping to conform to the serrations 18. In view of the fact that the entire crimping operation is made from the outside of the coupling in this instance, the mean diameter of the hose layers has been reduced including that of the mesh 10, the elastomer layers, and that of the inner liner 6, since the latter has yielded to conform to the serrations 18.

During the application of the coupling to the hose and thus during the crimping operation, it will be noticed that the nylon inner layer 6 becomes longer, as its wall thickness is reduced by yielding when the assembly is crimped. This axial motion partly relieves the assembly shear stress in the rubber at the inside diameter of the rubber liner, that is, the layer 8. The effect can be considered as analagous to the slipping that takes place between the rubber and inner shank in a standard assembly where the shear strains are limited in part by the coefficient of friction between the two surfaces. However, in the present invention, the effects are markedly different in the sense that in the hose and coupling of this invention, the layer 8 is bonded to the layer 6, and therefore does not slip.

As indicated above, one of the features of the invention is that at least within the coupling, the elastomer 8 is bonded to the inner layer 6. This is done, for example, by the use of an adhesive of the isocyanate type, following conventional practices.

A comparison of two hoses of the same size is given below. One of these is a standard hose one-half inch in diameter, standard S.A.E. Type 100 R2A using a coupling like that shown in FIG. 1. The second is a hose of the instant invention in which there is first the inner nylon tubing 6, then the layer 8, the mesh 10, and an outer elastomer coating 12, to which is applied the same coupling as in the first instance. The results are set forth in the table below. It will be noted that the total wall thickness of each hose is the same in each case.

TEST RESULTS at 250°F. and 7000 PSI

| | |
|---|---|
| Standard Hose | Rupture at coupling occurred in less than 500 cycles of pulsing. |
| Hose of this Invention | Rupture at coupling occurred between 20,000 to 28,000 cycles of pulsing. |

It is believed that all of these factors taken together result in lower stresses in the rubber liner of the hose of this invention as compared to the standard hose for similar assembly pressure conditions.

It will be found that because of the lower crimp strain necessary to make the hose and coupling assembly of this invention, in order to obtain a coupling to hose joint that does not rupture, the amount of extrusion of the elastomer layer or layers within the coupling is much less than in the standard hose.

As also mentioned above, the yielding of the thermoplastic inner layer 6 so that it conforms to the serrations of the inner shank substantially reduces strain, particularly in comparison to the local high strains normally imposed on the rubber at the inner shank in standard hose combinations of the prior art. It is to be noted that the manner in which the layer 6 conforms to the serrations also provides mechanical means for holding the hose on the coupling against pullout. This is in contrast to the conventional manner in which the inner layer is held to the shank by friction alone, rather than mechanically as in the case here. In addition, since the rubber portion 8 is bonded to the layer 6, and thus does not slip, the whole active length of the coupling is working. In those standard hoses where serrations are used, so that the liner rubber is subjected to the deformation of the inner shank serrations, nevertheless, due to the low elastic modulus of the rubber, the assembly is entirely dependent on friction to prevent pullout. In fact, it is suspected, although not proven, that in the prior art hoses, some additional slipping of the rubber liner over the inner ferrule takes place at the front of the coupling when the hose is working under pressure. The simple fact that actual pullout failures occur in some assemblies of the prior art tends to confirm this suspicion. The use of the thermoplastic layer 6 also assists, by its deformation, in smoothing out local distortions in the layer 8.

Because the holding mechanism in the hose of this invention and its coupling is primarily mechanical rather than through friction, it is thus possible to use lower assembly pressures. The lower limit of pressure would be that pressure which will cause inner layer 6 to conform to the serrations, but such that it is tight enough to prevent leakage between the hose and coupling. By heating the hose before crimping, or by using a softer layer 6, the yield point of the material forming inner layer 6 can be lowered, thereby reducing the necessary crimping pressures to make the composite liner conform to the serrations. It will be noted that the resulting lower amount of crimping pressure will also result in lower assembly strains on the elastomer in the hose, and therefore give an additional improvement in performance as well as permit a lighter coupling design.

It is also pointed out that the elastomer layer 8 between the wire reinforcement and inner layer 6 serves an important function: Because of the softness of the elastomer and the fact of its Poisson ratio being practically one-half there results a practically linear decrease in tension in reinforcing wires (of mesh 10) due to the working pressure over the length of the coupling. If the wires were woven directly onto the inner thermoplastic liner 6, the load would not be transmitted from the wires of mesh 10 to the coupling uniformly, and the front of the coupling would carry larger shares.

Furthermore, the bond between the wires in the rubber of the layer 8 is very important for transmitting the axial pull from the reinforcement to the liner and hence to the coupling.

The manner of making the hose 2 can follow standard procedures such as are well known in the art; and the method of attaching the coupling 4 onto the end of the hose 2 is also conventional in the art. The invention lies both in the hose 2 itself as described above, and in the combination of the particular hose with the coupling 4 in order to give optimum performance in a hose-coupling combination. While the embodiment shown is one using a crimped structure, the teachings herein apply as well to hose-coupling combinations which are assembled by means of pressure fittings.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. In combination, a hose and a coupling therefor attached at the end of the hose, the wall of the hose comprising a plurality of layers in the order named; an innermost layer of a tough and deformable thermoplastic resin selected from the group consisting of the polyamides, polyolefins, polyesters and thermoplastic polyurethanes, at least one layer of a thermosetting elastomer overlying the innermost layer and having a low modulus of elasticity, the innermost layer being bonded to the adjacent elastomer layer; and at least one layer of reinforcing material overlying said elastomer layer; the coupling comprising an outer sleeve surrounding the end of the hose, and an inner shank inserted in the bore of the hose, the sleeve and shank being forced together to squeeze the end of the hose tightly therebetween.

2. The combination of claim 1 in which the hose within said outer sleeve includes a protective outermost layer of flexible material selected from the group consisting of thermosetting elastomers polyamides, polyurethanes, and polyolefins.

3. The combination of claim 1 in which the outer surface of said shank is serrated and said innermost layer of the hose conforms, at least in part, to the serrations.

4. The combination of claim 1 in which the innermost layer is nylon, and said one layer is a rubberlike elastomer.

5. The combination of claim 1 in which said innermost layer is nylon, said one layer is rubber, and said reinforcing material is a wire wrapping.

6. The combination of claim 2 in which said innermost layer is nylon, said one layer is rubber, said layer of reinforcing material is a filamentary wrapping, and said outermost layer is rubber.

7. The combination of claim 3 in which said hose within said outer sleeve includes an outermost layer of rubberlike elastomeric material.

8. The combination of claim 7 in which said innermost layer is nylon, said one elastomeric layer is rubberlike elastomer, said layer of reinforcing material is a filamentary wrapping, and said outermost layer is a rubberlike elastomer.

9. The combination of claim 8 in which the layer of reinforcing material is a wire mesh.

10. The combination of claim 8 in which the layer of reinforcing material is a woven textile.

REEXAMINATION CERTIFICATE (765th)
United States Patent [19]
Flounders

[11] B1 3,540,486
[45] Certificate Issued Oct. 13, 1987

[54] HIGH PRESSURE HOSE

[75] Inventor: James M. Flounders, Hingham, Mass.

[73] Assignee: American Biltrite Rubber Co., Inc., Chelsea, Mass.

Reexamination Request:
No. 90/001,024, Jun. 5, 1986

Reexamination Certificate for:
Patent No.: 3,540,486
Issued: Nov. 17, 1970
Appl. No.: 757,998
Filed: Sep. 6, 1968

[51] Int. Cl.$^4$ .............. F16L 33/20; F16L 11/08; F16L 13/14
[52] U.S. Cl. .............. 285/156; 138/125; 138/127; 138/138
[58] Field of Search .............. 285/256, 257, 259, 149; 138/125, 127, 138, 109

[56] References Cited
U.S. PATENT DOCUMENTS
3,159,183  12/1964  Brumbach .

FOREIGN PATENT DOCUMENTS
903289  6/1972  Canada .
925241  5/1963  United Kingdom .
1017653  1/1966  United Kingdom .

OTHER PUBLICATIONS
Catalog–"U.S. Royalon Hose & Fittings"–Catalog 313, 1966, 12 pages.

*Primary Examiner*—Dave W. Arola

[57] ABSTRACT

The invention is a composite hose combined with a coupling, the characteristics of the hose and the coupling being such as together to minimize leaking between the hose and coupling, rupture of the hose and resulting break away from the coupling, and leakage from the hose itself. The hose is plural-layered, for example, as follows: An innermost layer of a plastic material such as nylon, next a layer of rubber, then a layer of a wire mesh reinforcement, and possibly a final outer layer of nylon or rubber. The coupling is compound, and comprises an inner shank fitting inside the end of the hose and an outer sleeve axial with the inner shank and overlying the end of the hose, the outer sleeve being compressed so as to squeeze the wall of the hose end and thus solidly anchor the end of the hose within the coupling.

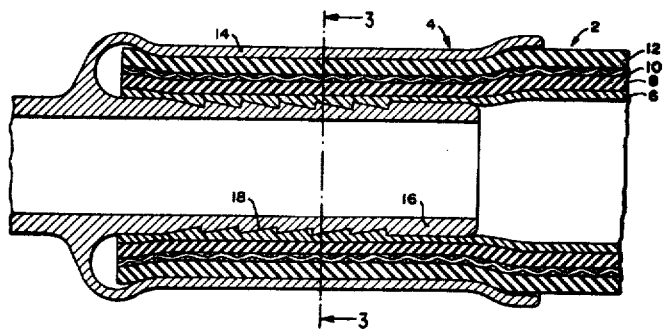

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *